United States Patent [19]

Andrieu et al.

[11] Patent Number: 5,014,065

[45] Date of Patent: May 7, 1991

[54] METHOD FOR THE ON-LINE TESTING OF A RADAR INFORMATION DISPLAY DEVICE, AND IMPLEMENTATION OF THIS METHOD

[75] Inventors: Jean-Pierre Andrieu, Paris; Jean-Claude Henri, Boulogne Billancourt; Dominique Gault, Ville D'Avray, all of France

[73] Assignee: Thomson-CSF, Puteaux, France

[21] Appl. No.: 455,439

[22] PCT Filed: May 10, 1988

[86] PCT No.: PCT/FR88/00228

§ 371 Date: Nov. 14, 1989

§ 102(e) Date: Nov. 14, 1989

[87] PCT Pub. No.: WO88/08987

PCT Pub. Date: Nov. 17, 1988

[30] Foreign Application Priority Data

May 15, 1987 [FR] France ............... 87 06846

[51] Int. Cl.$^5$ .................................................. G01S 7/40
[52] U.S. Cl. ........................................ 342/165; 342/173
[58] Field of Search ............................... 342/165, 173

[56] References Cited

U.S. PATENT DOCUMENTS

| 4,580,164 | 4/1986 | Andrieu et al. | 342/140 |
| 4,660,043 | 4/1987 | Lachaize et al. | 342/185 |
| 4,729,029 | 3/1988 | Henri et al. | 342/183 |
| 4,740,789 | 4/1988 | Henri et al. | 342/185 |
| 4,757,319 | 7/1988 | Henri et al. | 342/185 |
| 4,774,516 | 9/1988 | Henri et al. | 342/185 |
| 4,947,176 | 8/1990 | Inatsune et al. | 342/173 |

Primary Examiner—John B. Sotomayor
Attorney, Agent, or Firm—Pollock, Vande Sande & Priddy

[57] ABSTRACT

The object of the invention is a method and implementation means for the on-line testing of a radar information display device such as an image digital converter. The method essentially consists, firstly, in determining zones where there is no echo for a given antenna rotation then, secondly, the speeds of the displayed objects being known, in determining a second zone where there will definitely be no echo in the next rotation. In a third step, a test sequence is inserted in the second zone; at output of the function being tested, the pieces of data corresponding to the sequence, are, firstly, recorded and, secondly, blacked out for non-transmission to the rest of the chain. The recorded output sequence is then compared with the expected theoretical result, and from this comparison a piece of information on proper functioning or malfunctioning is deduced.

6 Claims, 8 Drawing Sheets

METHOD FOR THE ON-LINE TESTING OF A RADAR INFORMATION DISPLAY DEVICE, AND IMPLEMENTATION OF THIS METHOD

FIELD OF THE INVENTION

The present invention relates to on-line testing of a radar information device and more particularly to an image digital converter.

BACKGROUND OF THE INVENTION

To check that a piece of electronic equipment is working properly, it is usual to provide for the incorporation of built-in tests when designing it. These tests are of two types:

off-line tests which take place at least when the equipment is started up, and achieve a fairly complete and precis verification of its state before its effective operational starting; during these tests, the basic function fulfilled by the piece of equipment is not performed.

on-line tests which occur permanently during the operational functioning of the equipment and which should, therefore, be transparent with respect to this functioning, i.e. should not disturb it; they are often less complete than the former tests but they are nonetheless capable of detecting and approximately localizing a failure that takes place during operation.

The present invention concerns an on-line testing method applied to a radar information display device, notably to an image digital converter.

One of the common methods applied for on-line tests is input/output comparison. The equipment is divided here into some essential functions at the level of which the comparisons are made between the input signals and output signals of the function considered. It is then a question of ascertaining that, for a given set of input values of the function, the output result is actually the expected result, this result being obtained by computation, elsewhere, using software for example, of the result that has to be obtained by applying the function to the same set of values.

For the implementing of this method, two methods are known:

the input data of the function to be tested are useful data, which go through the whole processing chain of the equipment; these pieces of data are then recorded at input and output of the function being tested; in deferred time, the function considered is subjected to input recording to obtain the theoretical output values which are compared with the recording of the real output signals, and the result of the comparison then gives the indication of proper functioning or of malfunctioning;

the input data of the function to be tested may be interrupted, either because they are known beforehand or because they are temporarily insignificant; a test sequence is then introduced at input of the considered function; at output of this function, the pieces of data corresponding to this sequence are, on the one hand, recorded and, on the other hand, blacked out so that they are not transmitted to the rest of the processing chain; the function under test is furthermore subjected to the input sequence and, as previously, a verification is done, as above, of the real output sequence recorded.

The advantage of the second method lies in the possibility of choosing the test sequence, which may then be adapted more particularly to the function to be tested, and hence it lies in greater efficiency. Its drawback is that it is necessary to have a free zone available, where the pieces of data are not significant or have a particular known value, which may be restored at a point further downline of the processing chain.

In the case of a display of radar information obtained by successive scans of a zone, for example by the rotation of an antenna, according to the invention during a given antenna rotation, there is determined a zone where there is no radar echo; knowing the speed of the objects displayed (aircraft for example), a second zone is determined, located within the first one, where there will certainly be no echo during the next antenna rotation, and the operation is done substantially according to the above-described second method, in inserting and then blacking out test sequences.

More precisely, the method according to the invention is a method for the on-line testing of a device for the display of pieces of radar information, these pieces of information being obtained by successive scans of a predefined zone; the device has a processing chain wherein a first determined function, at least, is performed; the method principally comprises the following stems:

analysis of the incident radar information corresponding to a first scan to determine a first zone ($Z_0$) the video signal of which is substantially zero;

determination of a second zone ($Z_1$), located inside the first zone, wherein the video signal will be substantially zero at the following scan, called the second scan;

emission, during the second scan and instead of the incident radar information corresponding to the second zone, of a series of signals forming a test sequence;

execution of the first function on the test sequence;

memorizing of the test sequence at output of the first function;

comparison of the memorized sequence with its theoretical value and emission of a piece of information of error in case of difference;

blacking out of the test sequence at output of the first function, with respect to the sequence of the processing chain.

Other objects, particular features and results of the invention will emerge from the following description, illustrated by the appended drawings, which represent:

BRIEF DESCRIPTION OF THE FIGURES

In these different figures, the same references pertain to the same elements.

DETAILED DESCRIPTION OF THE INVENTION

Figure 1:
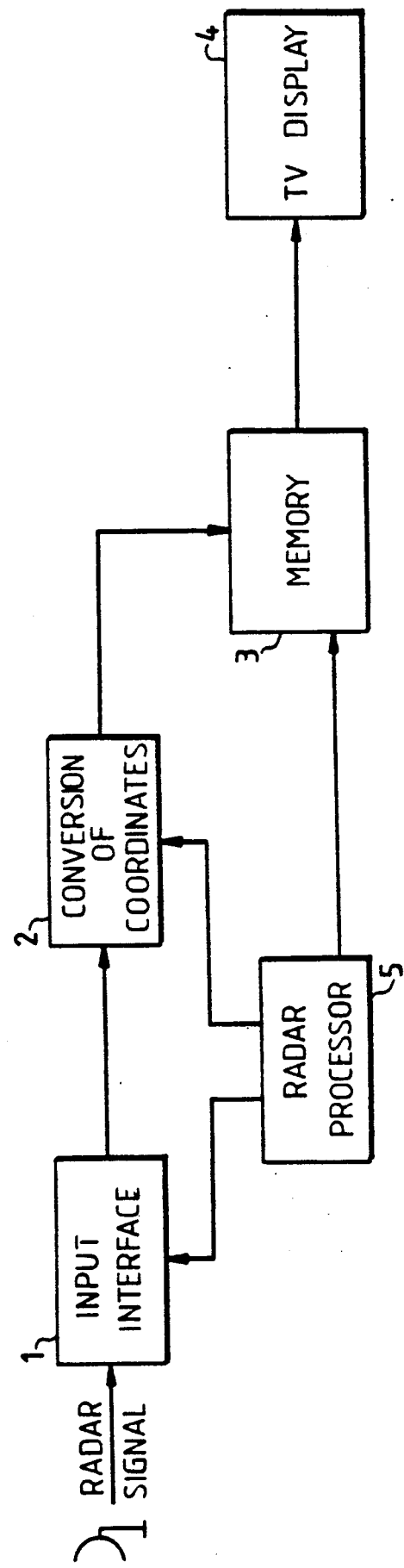
FIG. 1, a block diagram of an image digital converter used for the display of radar information.

FIG. 1 is thus a block diagram of an image digital converter used for the display of radar information.

A digital image converter, also called an IDC, enables the display in television mode of a piece of information given by a radar receiver in polar coordinates. An example of an IDC is described in the French patent application No. 85 05013 on behalf of THOMSON-CSF. An IDC such as this can be split up into European patent application No. 0202132 on behalf of THOMSON-CSF. An IDC such as this can be split up into several sub-assemblies, each performing an independently testable operational function:

a sub-assembly 1, forming an input interface and connected to the radar receiver;

a sub-assembly 2, providing for the conversion of the polar coordinates into Cartesian coordinates;

a memory sub-assembly 3, in which the radar information is recorded in the format in which it will be displayed in television mode by a device 4 (Cartesian coordinates).

The chief function of the interface 1 is the acquisition of the radar video signal, namely its sampling, its digitalization and its memorizing as well as, if necessary, certain brief processing operations on this video signal.

The coordinates conversion sub-assembly 2 enables the computation of the address in memory (3) of each of the points of the radar video signal.

The memory sub-assembly 3 also comprises remanence circuits, providing for an artificial aging of the information memorized as and when the radar antenna rotates, thus simulating the remanent screens.

These different sub-assemblies are controlled and initialized by a processor 5.

The above-described processing chain may also comprise a synthetic video signal insertion sub-assembly, formed by cards, tracks and contacts . . . , which is sent to the display device 4 in synchronism with the television scan, this sub-assembly being positioned between the memory 3 and the display device 4.

Figure 2:
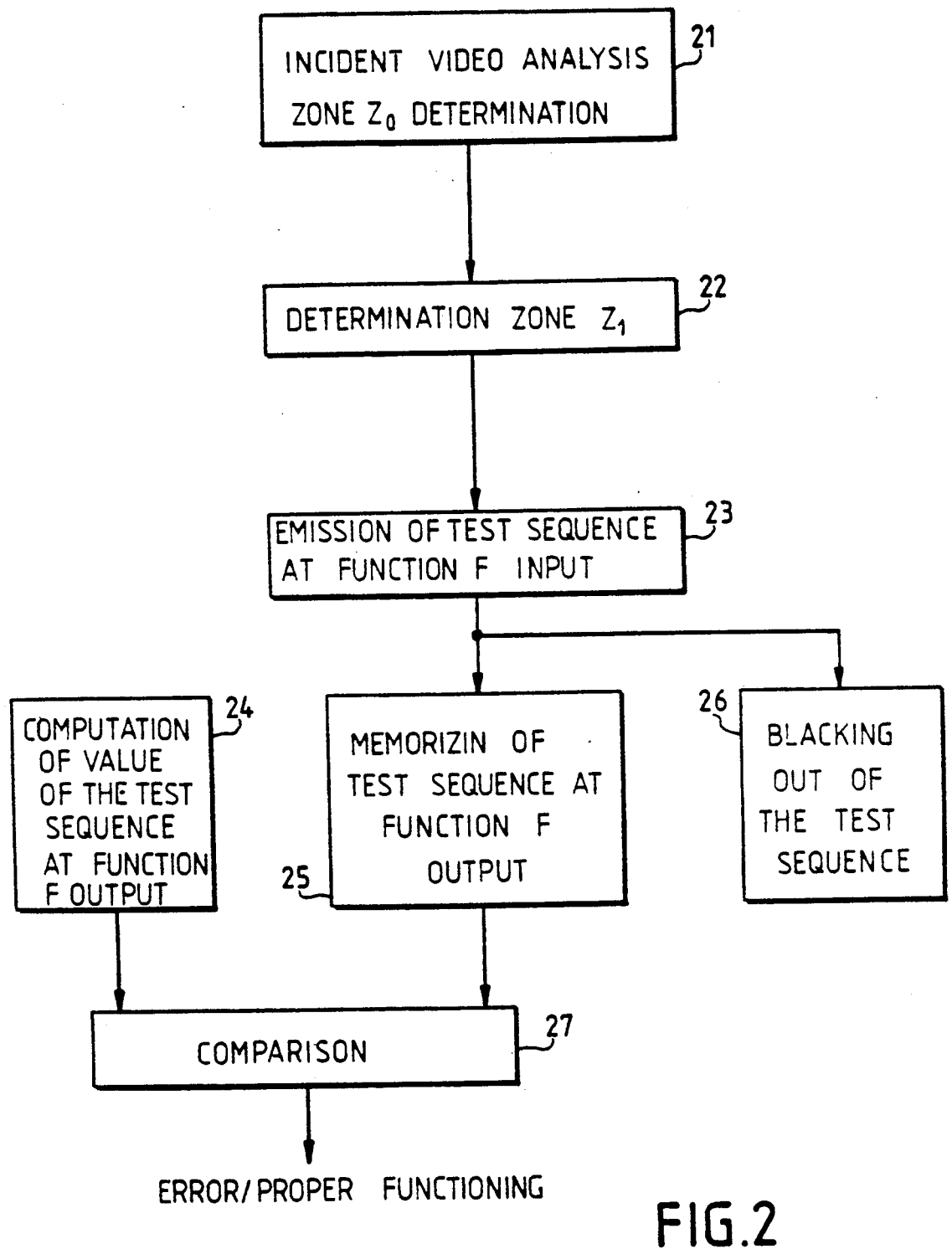
FIG. 2, a mode of sequencing of the method according to the invention.

FIG. 2 represents a mode of sequencing of the method according to the invention for the testing of a function fulfilled by one of the sub-sets of the preceding figure.

The radar video signal is obtained by successive scans of a predefined zone. These may be, for example, scans by rotation of an antenna over 360°. It is this latter case that is taken, as an example, for the following description.

The first step, referenced 21, consists in analyzing the incident video signal, i.e. the one that arrives at the input of the function to be tested, referenced F, in order to determine a zone, or window, called $Z_0$, in which there is no radar echo, i.e. where the video signal is substantially zero or smaller than a predefined detection threshold, and is so for a determined antenna rotation, referenced T.

The next step, referenced 22, consists in determining a second zone $Z_1$ in which there will definitely be no echo at the next antenna rotation (referenced T+1). This determining is done without difficulty inasmuch as, for a given radar, the ranges of speed of the moving objects which it is desired to detect are known: the zone $Z_1$ is then defined as a zone located inside the zone $Z_0$ at a distance which is at least equal to the maximum speed of the moving objects multiplied by the time between two scans, i.e. the period of rotation of the antenna. The zones $Z_0$ and $Z_1$ are illustrated in the FIGS. 5 to 7.

The next step, referenced 23, consists in emitting a series of signals forming a test sequence at the input of the function F. This emission is done at the rotation T+1, during at least one part of the video signal corresponding to the zone $Z_1$.

The test sequence is processed by the function F being tested, then recorded at its output during the next step, referenced 25. At the same time, the test sequence is blacked out at output of the function F during a step 26, so as not to be transmitted to the rest of the processing chain.

Besides, the theoretical value of the test sequence, when the function F is applied to it, is computed (step 24).

Finally, a comparison (step 27) is made of this theoretical value with the previously memorized real value (step 25), the result of the comparison giving an information of error or proper functioning of the function F.

Figure 3:
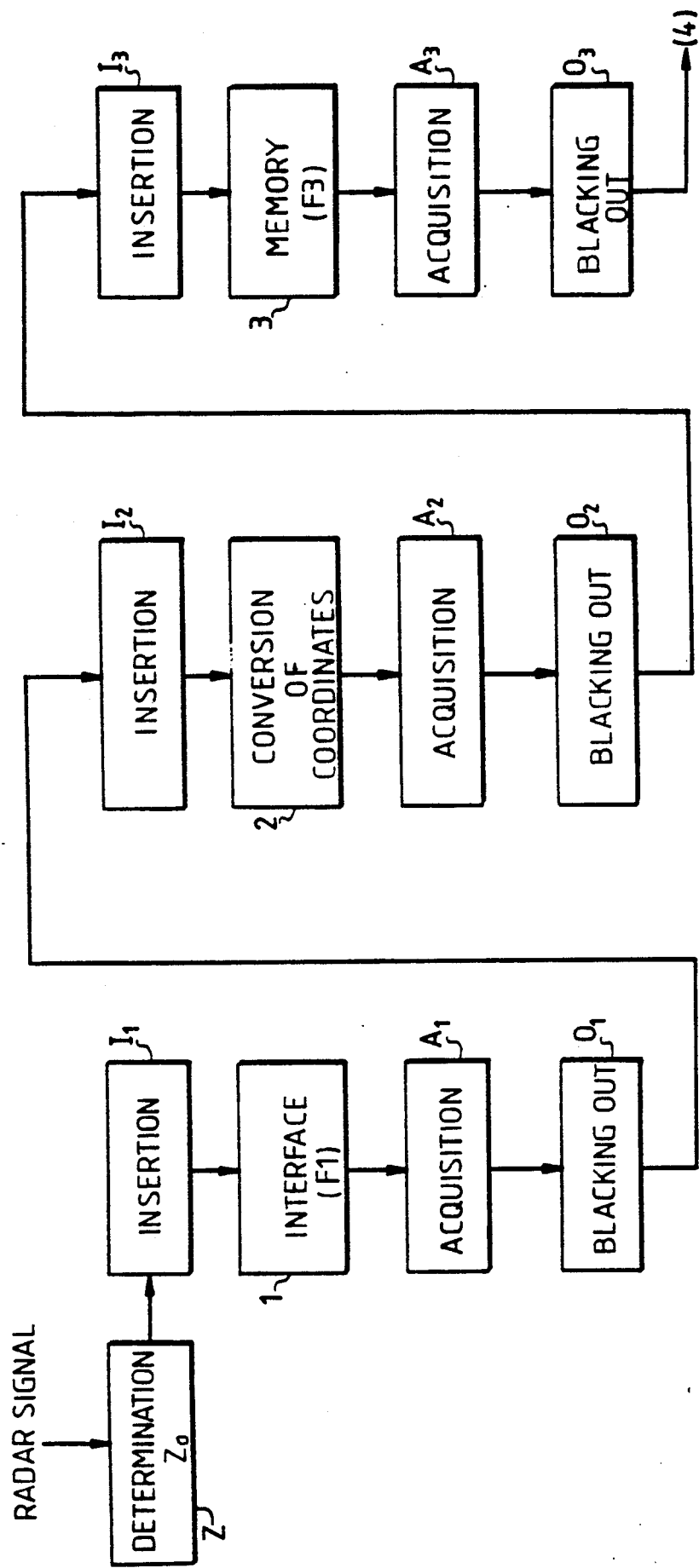
FIG. 3, a mode of implementation of the method according to the invention in an image digital converter.

FIG. 3 shows a mode of implementation of the method according to the invention for the testing of the different functions of an image digital converter, as described in FIG. 1.

In this embodiment, the three sub-assemblies 1, 2 and 3 of FIG. 1 are thus tested independently, the functions fulfilled by these sub-assemblies being respectively designated by $F_1$, $F_2$ and $F_3$, the entire unit being performed under the control and supervision of the processor 5 of FIG. 1, not shown herein.

The incident radar signal is given to the circuit Z for determining the zone $Z_0$, then to an insertion circuit $I_1$ before reaching the interface 1 (function $F_1$). The function of the circuit Z is to detect a zone without echo such as $Z_0$, enabling the processor to deduce $Z_1$ therefrom. The function of the insertion circuit $I_1$ is to emit, at the next rotation, at input of the interface 1, a predefined test sequence, more particularly suited to the testing of this interface.

In accordance with the method described in FIG. 2, the interface 1 is followed by an acquisition circuit $A_1$, enabling the test sequence to be memorized after it leaves the interface 1, then by a circuit $O_1$ for blacking out this test sequence, so that it is not transmitted to the rest of the processing chain.

Similarly, the other two functions, namely the coordinates conversion ($F_2$) and memory ($F_3$) functions, are each preceded by an insertion circuit ($I_2$, $I_3$), having the function of emitting an adapted test sequence at the input of the function considered; they are followed by a circuit ($A_2$, $A_3$) for acquisition of the test sequence as it is presented at the output of the function tested, and by a blacking-out circuit ($O_2$, $O_3$) of this test sequence, in order to prevent its transmission to the rest of the chain.

FIGS. 4a to 4d each represent an embodiment of the circuits used in FIG. 3.

Figure 4A:
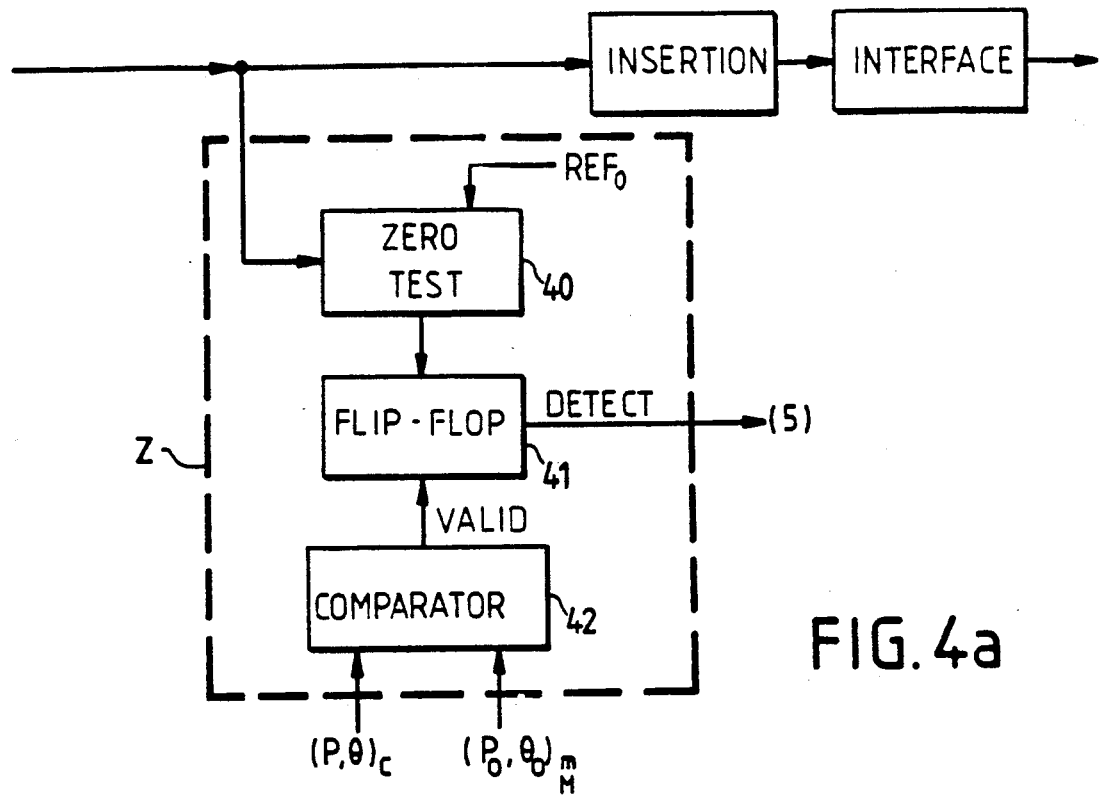
FIGS. 4a to 4d, an embodiment of the different circuits of the above figure.

FIG. 4a represents the circuit Z for determining the zone $Z_0$.

The circuit Z is placed in parallel at the input of the radar signal on the insertion circuit $I_1$.

It comprises:

a circuit 40, receiving the incident radar signal and a reference signal $REF_0$, which is a threshold below which the incident signal is considered to be zero; this circuit thus permanently detects the zones where there is no radar echo;

a comparator 42 which receives, firstly, the pair of current values $(\sigma, \theta_0)_c$ and, secondly, the pairs $(\sigma_0, \theta_0)_m$ and $(\sigma, \theta_0)_M$ of these values defining the window $Z_0$ (illustrated in FIG. 5) which are given to it by the radar processor 5; when the values $(\sigma, \theta)_c$ are included in the window $Z_0$, the comparator 42 emits a validation signal, referenced VALID;

a logic circuit 41 such as a flip-flop, receiving the VALID signal and the result of the zero test; the flip-flop 41 gives the radar processor (5) a $Z_0$ detection signal when it effectively detects a zero video signal in the window $Z_0$ which is given to it.

Figure 4B:
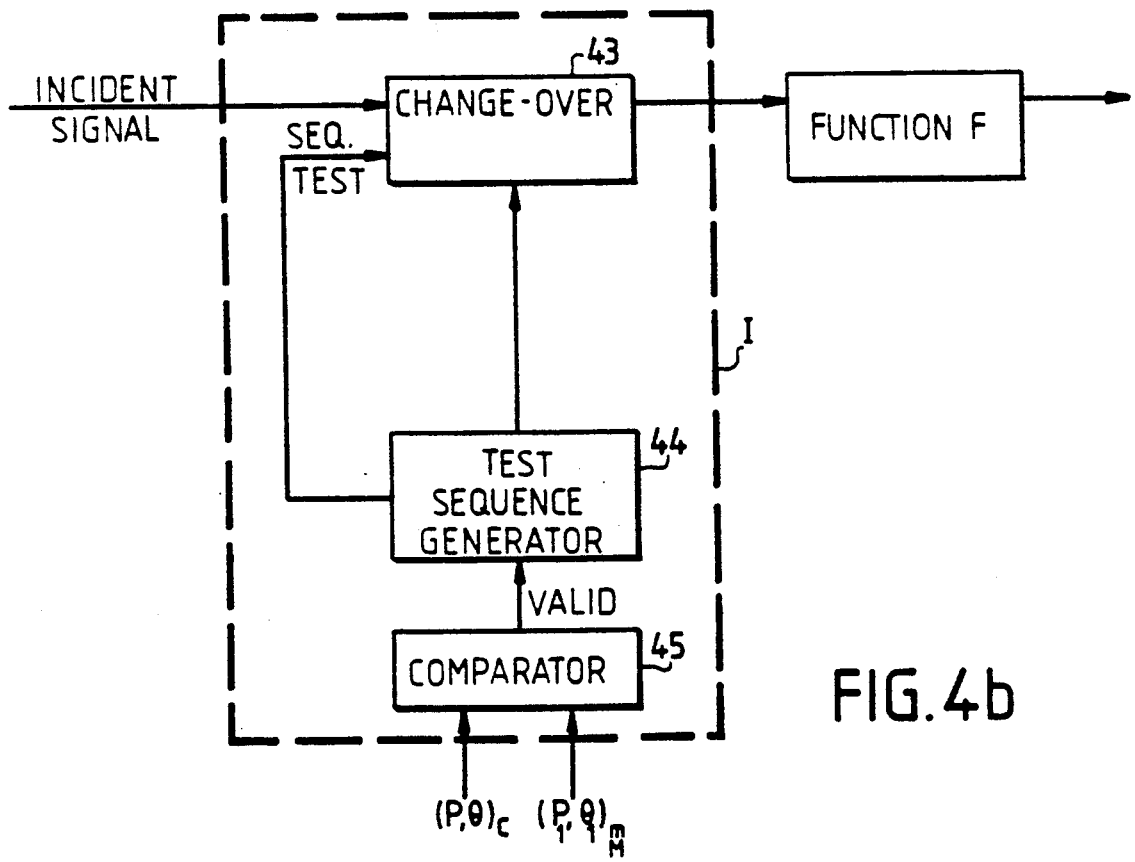

FIG. 4b represents an insertion circuit I, such as $I_1$, $I_2$ or $I_3$, placed upline of a function F to be tested.

The circuit I comprises:

a comparator 45, similar to the comparator 42 of the circuit 7 (FIG. 4a) which receives the pair of current values $(\sigma, \theta)_c$ and the pairs $(\sigma_1, \theta_1)_M$m corresponding to the zone $Z_1$ determined by the processor 5;

a generator 44, giving a test sequence, under the control (VALID signal) of the comparator 45, during the zone $Z_1$;

a change-over switch 43, interposed on the path of the incident signal towards the function F, controlled by the generator 44 and providing for the switching-over between the incident signal and the test sequence.

Figure 4C:
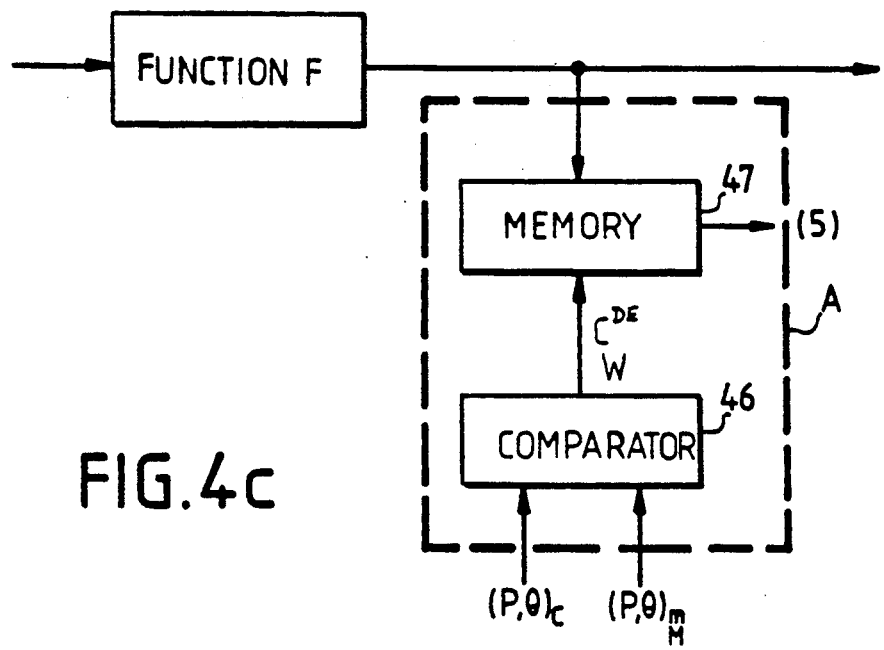

FIG. 4c represents an acquisition circuit A, such as $A_1$, $A_2$ or $A_3$, placed in parallel at the output of a function F to be tested.

This circuit A also has a comparator 46, similar to the comparator 42 or 45, making it possible to control the writing, in a memory 47, of the test sequence at output of the function F, in the reception window $(\sigma, \theta)_M$m (for example, $Z_3$, FIG. 6) given to it by the processor. Under the control of the comparator 46, the memory 47 memorizes the test sequence to transmit it to the processor 5.

Figure 4D:
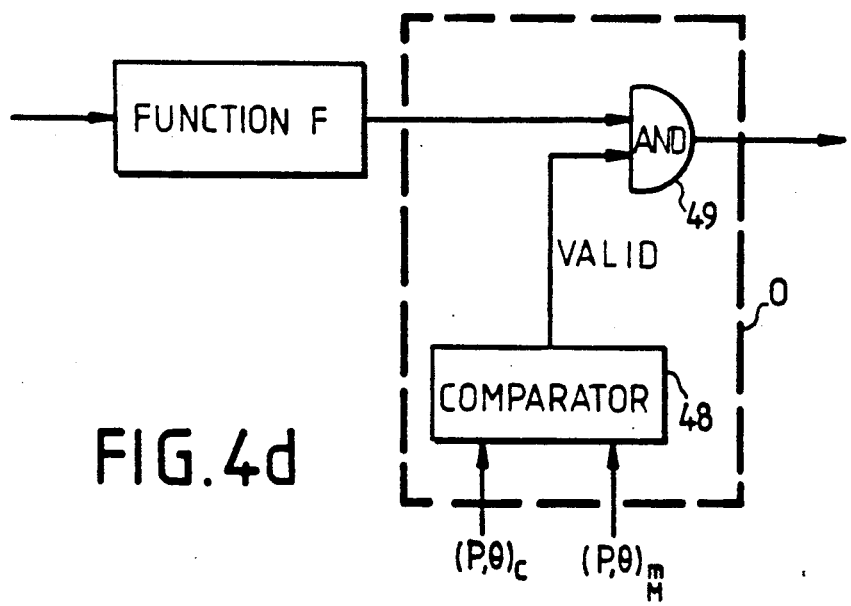

FIG. 4d represents a blacking-out circuit O, such as $O_1$, $O_2$ or $O_3$ placed in the processing chain at the output of the function F being tested.

In a similar way, the circuit 0 comprises:

a comparator 48, emitting a validation signal (VALID) when it identifies the blacking-out window (for example $Z_1$, FIG. 6) given to it by the processor 5;

a logic circuit 49, of the AND type, interposed in the path of the output signal of the function F and inhibiting the transmission of this signal under the control of the VALID signal.

Figure 5:
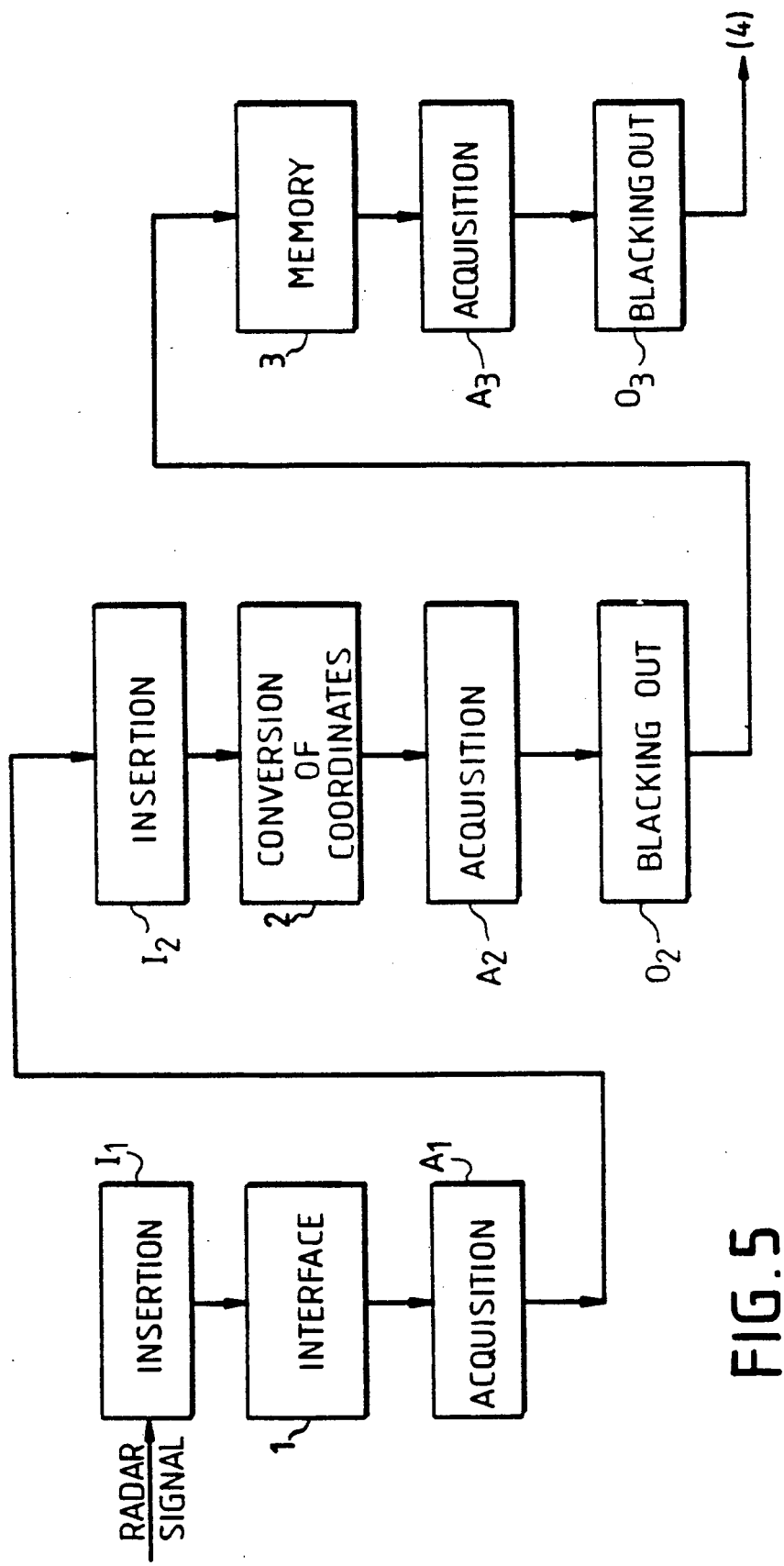
FIG. 5, a second mode of implementation of the method according to the invention in an image digital converter.

FIG. 5 represents another mode of implementation of the method according to the invention, also in an image digital converter such as the one schematized in FIG. 1, but wherein a certain number of the circuits described in FIG. 3 are eliminated so as to lighten the making of the device.

It would appear, firstly, that as compared with FIG. 3, the circuit Z for determining the zone $Z_0$ no longer appears in FIG. 5. This function is filled solely at the level of the acquisition circuit $A_1$, it being known that a non-zero video signal, in a given range, at the output of the interface 1, may mean either that the video signal is not zero at the input of the IDC or that there is a mal-functioning of the sub-assembly 1. To avoid this ambiguity, in one alternative embodiment, a decrease is brought about in the size of the window $(Z_O)$ in which a zero video signal is sought, and the zero detection thresholds are varied. If it is then not possible to find a zero video zone, it is likely to be a question of faultiness in the sub-assembly 1.

As compared with FIG. 3, the blacking-out circuit $O_1$ is eliminated, this being done only by the blacking-out circuit $O_2$, located after the coordinates conversion assembly. In case of ambiguity, the insertion circuit $I_2$, placed before the coordinates sub-assembly 2, enables this sub-assembly to be tested by itself. More generally, it is not indispensable to black out a test sequence immediately after the function considered, for as long as there is no memorizing effect.

Since the memory function ($F_3$) includes a remanence function which is exerted on several rotations of the radar antenna, it is necessary for every test video signal to be blacked out before this function $F_3$ (circuit $O_2$). Furthermore, the acquisition circuit $A_1$ (or $A_0$ in the case of FIG. 3) should take this remanence into account, that is, it should detect a zone $Z_0$ which is large enough to enable the determining of a zone $Z_1$ which, after several antenna rotations, still has a sufficient size (see FIG. 8). In one alternative embodiment, instead of acting on the size of the zone $Z_0$, the remanence function in the zone considered is accelerated or completely eliminated. In another alternative embodiment, the acceleration of the remanence may be made a function of the proximity of the detected echos of the concerned zones.

Furthermore, the insertion circuit $I_3$ of FIG. 3 has also been removed from the embodiment of FIG. 5, the test sequence used for the function $F_3$ being generated by the circuit $I_2$ for example, it being understood that the working of the blacking-out circuit $O_2$ is not permanent.

In the same way, in one alternative embodiment (not shown), the insertion circuit $I_2$ is eliminated, the test sequence of the function $F_2$ being then generated by the circuit $I_1$.

Of course, the test video signal should be blacked out (circuit $O_3$) before the display 4.

Figure 6:
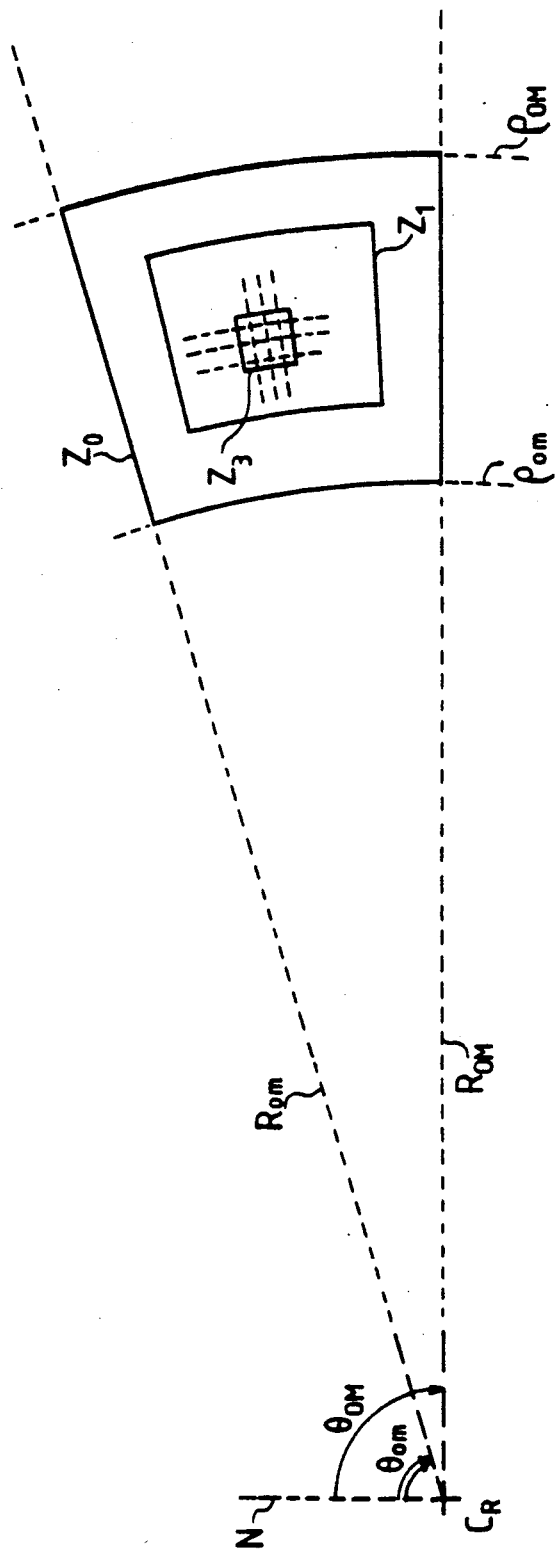
FIGS. 6, 7 and 8 are diagrams illustrating the working of the method according to the invention.

FIG. 6 is a drawing showing the different zones in which the tests are made, as regards the interface function $F_1$.

In this figure are shown: the radar center $C_R$, a reference direction, for example the North, from which the polar angles $\theta$ are computed; the zone $Z_0$ which, it is recalled, is a zone without echo (with substantially zero video signal) detected during a given antenna rotation T. The zone $Z_O$ is, for example, limited by two radials $R_{om}$ and $R_{OM}$, corresponding to polar angles $H_{om}$ and $\theta_{OM}$ limited to the values $\sigma_{om}$ and $\sigma_{OM}$ of the modulus $\sigma$.

There is also shown, inside this zone $Z_0$, the zone $Z_1$ wherein no echo is present at the next antenna rotation (T+1). The test sequence is therefore emitted in the place of the incident video signal at the instant corresponding to the scanning of this zone $Z_1$, for example in a zone $Z_3$. At the output of the function $F_1$ test sequence, the video signal is blacked out in using, for example, the window $Z_1$ and the test signal is memorized by the circuit $A_1$ in the window $Z_3$ or a smaller-sized window.

In practice, as explained above, these windows entail the dispatch of commands by the radar processor (5, FIG. 1) in terms of pairs of values $(\sigma, \theta)$m, to the different circuits concerned.

Figure 7:
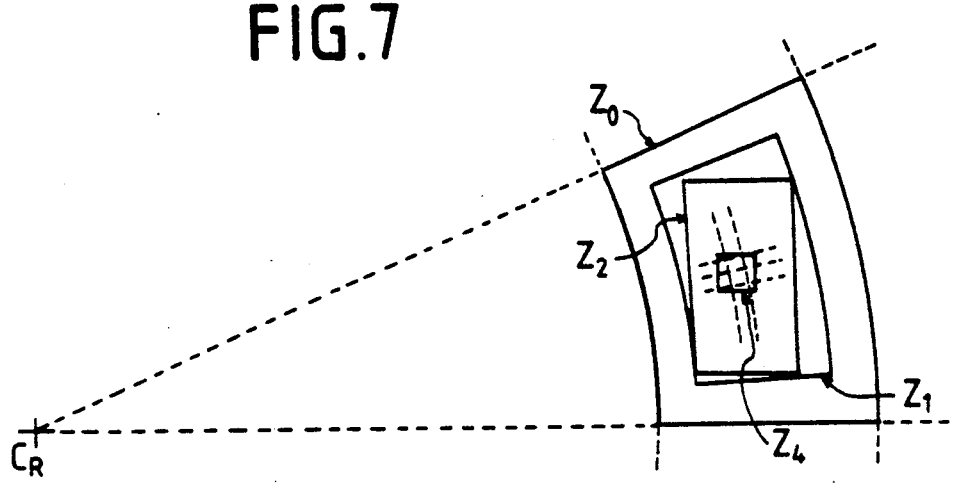

FIG. 7 is a drawing similar to that of FIG. 6, but for the test of the coordinates conversion function $F_2$.

It will be recalled that the video signal is expressed in polar coordinates upline of the coordinates conversion sub-assembly 2, but in Cartesian coordinates downline of this sub-assembly, in accordance with the organization of memory 3.

The structure of the windows should evidently follow the same rule.

FIG. 7 therefore again shows the zones $Z_0$ and $Z_1$ in a manner similar to that described earlier. It also shows a window $Z_2$ corresponding to the window $Z_1$, i.e. a window without echo at the antenna rotation T+1, but expressed in Cartesian coordinates, i.e. a rectangular window strictly included in the window $Z_1$ and used as a blacking-out window for the circuit $O_3$, then at output of the conversion sub-assembly 2, the pieces of data are expressed in Cartesian coordinates.

The test sequence is emitted, as previously, in polar coordinates, but the window for memorizing these data after testing should be expressed in Cartesian coordinates, then located at the output of the conversion assembly: it is the rectangular zone referenced $Z_4$ in the figure, strictly contained in the zone $Z_2$.

Figure 8:
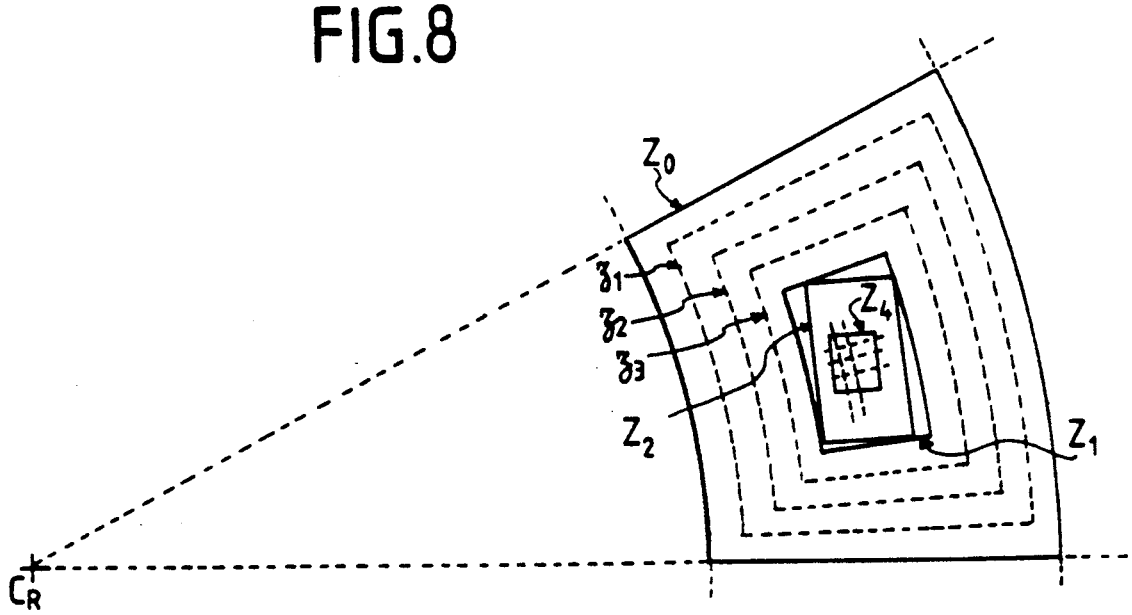

FIG. 8 is a drawing similar to the two preceding ones, but concerns the testing of the memory sub-assembly 3.

This figure again shows the same zones $Z_0$, $Z_1$, $Z_1$ and $Z_4$ as in FIG. 7, except that the zone $Z_0$ is far bigger: for, since the remanence mechanisms extend over several antenna rotations, as explained above, it is necessary to perform the tests in a zone $Z_1$ which is definitely without echo after the number of rotations needed for the remanence function.

In the example of the figure, dashes are used to represent concentric zones $z_1$, $z_2$, $z_3$, intermediate between $Z_0$ and $Z_1$, illustrating a mechanism of remanence extending over three rotations.

The above description has been clearly made by way of a non-restrictive example. Thus, for example, configurations other than that of FIG. 4 could be planned on the basis of the complete configuration of FIG. 3.

We claim:

1. Method for the on-line testing of an image digital converter used for the display of radar information, the converter receiving the radar video signal obtained by successive scans of a predefined zone by rotation of an antenna and comprising, in a processing chain, at least one first sub-assembly wherein a first determined function is performed;

the method being characterized in that it comprises the following steps:

analysis of the radar video signal received corresponding to a first scan to determine a first zone ($Z_0$) the video signal of which is below a predefined detection threshold;

determination of a second zone ($Z_1$), located inside the first zone, wherein the video signal will be below the predefined detection threshold a the following scan, called the second scan;

emission, during the second scan and instead of the radar video signal received corresponding to the second zone, of a series of signals forming a test sequence;

execution by the first sub-assembly of the first function on the test sequence;

memorizing of the test sequence at output of the first sub-assembly;

comparison of the memorized sequence with a predetermined, theoretical value and emission of a piece of information of error in case of difference; and blacking out of the test sequence after its passage through the first sub-assembly, with respect to the sequence of the processing chain.

2. Device for the on-line testing of of a radar image digital converter, for the implementation of the method according to claim 1, the converter receiving the radar video signal obtained by successive scans in a predefined zone by rotation of an antenna and comprising, in a processing chain, at least one first sub-assembly in which a first function is executed, the device being characterized in that it comprises, to be connected upline of the first sub-assembly of execution of the first function:

means (Z) of determination of the first zone ($Z_0$) and of the second zone ($Z_1$) to analyze the radar video signal received;

means (I) of emission of the test sequence arranged to insert the sequence in the first sub-assembly during the second zone; and that it comprises, to be connected downline of said first sub-assembly of execution:

means (A) of acquisition, providing for the memorization of the test sequence at output of the first sub-assembly;

means (O) of blacking out the test sequence after its passage through the first sub-assembly.

3. Image digital converter used for the display of radar information, successively comprising:

interface means (I) receiving the video signal obtained by successive scans of a predefined zone by rotation of an antenna, and expressed in polar coordinates;

coordinates conversion means (2), receiving the video signal in polar coordinates and giving it in Cartesian coordinates;

memory means (3) providing for the memorizing of the video signal after conversion of coordinates; the converter being characterized by the fact that it comprises, for the implementation of the method according to claim 1:

a first device according to claim 2, connected to the interface means (1) to provide for the test of the function performed by these interface means;

a second device according to claim 2, connected to the coordinates conversion means (2) to provide for the test of the function performed by these conversion means;

a third device according to claim 2, connected to the memory mean (3) to provide for the test of the function performed by these memory means; the means of determination of the first zone ($Z_0$) being common to the first, second and third devices and being placed upline of the first device.

4. Image digital converter used for the display of radar information, successively comprising:

interface means (I) receiving the video signal obtained by successive scans of a predefined zone by rotation of an antenna, and expressed in polar coordinates;

coordinates conversion means (2), receiving the video signal in polar coordinates and giving it in Cartesian coordinates;

memory means (3) providing for the memorizing of the video signal after conversion of coordinates; the converter being characterized by the fact that it comprises, for the implementation of the method according to claim 1:

first means ($I_1$) of insertion of the test sequence, placed upline of the interface means (1);

first means ($A_1$) of acquisition, providing for the determining of the first zone ($Z_0$) and the memorizing of the test sequence, placed downline of the interface means (1) and upline of the coordinates conversion means (2);

second means ($A_2$) of acquisition, providing for the memorization of the test sequence applied to the coordinates conversion means (2) and placed downline of these conversion means;

first means (O$_2$) of blacking out the test sequence applied to the coordinates conversion (2) placed downline of the second acquisition means and upline of the memory means (3);

third means (A$_3$) of acquisition, providing for the memorizing of the test sequence applied to the memory means (3) and placed downline of these means;

second means (O$_3$) of blacking out the test sequence applied to the memory means, placed downline of the third acquisition means.

5. Converter according to claim 4, characterized by the fact that it further comprises second means (I$_2$) of emission of a test sequence, placed upline of the coordinates conversion means (2).

6. Converter according to one of the claims 3 to or 5, characterized by the fact that it further comprises a processor providing for the control and synchronization of the different means, the supply, to the different means, of the limit values defining said first and second zones, as well as the memorizing and blacking out zones.

* * * * *